US011879962B2

(12) United States Patent
Sick et al.

(10) Patent No.: US 11,879,962 B2
(45) Date of Patent: Jan. 23, 2024

(54) METHOD FOR UNAMBIGUOUSLY DETERMINING THE SPEED OF AN OBJECT ON A RADAR MEASURING SYSTEM

(71) Applicant: ZF FRIEDRICHSHAFEN AG, Friedrichshafen (DE)

(72) Inventors: Benjamin Sick, Bodolz (DE); Stefan Zechnar, Weißensberg (DE); Michael Walter, Heerbrugg (CH); Kevin Cinglant, Plouzane (FR)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 679 days.

(21) Appl. No.: 16/977,880

(22) PCT Filed: Feb. 6, 2019

(86) PCT No.: PCT/EP2019/052827
§ 371 (c)(1),
(2) Date: Sep. 3, 2020

(87) PCT Pub. No.: WO2019/170347
PCT Pub. Date: Sep. 12, 2019

(65) Prior Publication Data
US 2021/0003694 A1 Jan. 7, 2021

(30) Foreign Application Priority Data
Mar. 6, 2018 (DE) ........................ 10 2018 203333.1

(51) Int. Cl.
*G01S 13/58* (2006.01)
*G01S 7/35* (2006.01)
*G01S 13/00* (2006.01)

(52) U.S. Cl.
CPC .............. *G01S 13/583* (2013.01); *G01S 7/35* (2013.01); *G01S 13/003* (2013.01)

(58) Field of Classification Search
CPC ...... G01S 13/931; G01S 13/42; G01S 13/343; G01S 13/584; G01S 13/878; G01S 2013/93271; G01S 13/536; G01S 7/352; G01S 13/589; G01S 13/89; G01S 7/03; G01S 2013/0245; G01S 13/582; G01S 7/356; G01S 7/354; G01S 7/2883; G01S 13/003; G01S 13/04; G01S 2013/0254; H04B 7/0413

See application file for complete search history.

(56) References Cited

U.S. PATENT DOCUMENTS 10,126,409 B2 * 11/2018 Loesch ................... G01S 13/42
10,649,076 B2   5/2020 Schoor et al.
2013/0113652 A1 * 5/2013 Smits ..................... H01Q 3/267
                                                                342/174

(Continued)

FOREIGN PATENT DOCUMENTS

DE     102011113015    3/2013
WO     2013034282      3/2013

*Primary Examiner* — Olumide Ajibade Akonai
(74) *Attorney, Agent, or Firm* — TAROLLI, SUNDHEIM, COVELL & TUMMINO L.L.P.

(57) ABSTRACT

The invention relates to a method on a radar measuring system for determining a uniform speed, in which method two antenna pairs, each consisting of a transmitting antenna and a receiving antenna, are mapped to the same position within a virtual antenna arrangement.

12 Claims, 4 Drawing Sheets

(56) References Cited

U.S. PATENT DOCUMENTS

| | | | |
|---|---|---|---|
| 2016/0131742 A1* | 5/2016 | Schoor | H01Q 3/247 342/128 |
| 2016/0146931 A1* | 5/2016 | Rao | G01S 13/931 342/59 |
| 2017/0131396 A1 | 5/2017 | Schoor et al. | |
| 2017/0141454 A1* | 5/2017 | Welle | H01Q 21/065 |
| 2018/0011170 A1* | 1/2018 | Rao | G01S 13/92 |
| 2021/0364614 A1* | 11/2021 | Loesch | G01S 13/42 |

* cited by examiner

METHOD FOR UNAMBIGUOUSLY DETERMINING THE SPEED OF AN OBJECT ON A RADAR MEASURING SYSTEM

RELATED APPLICATIONS

This application corresponds to PCT/EP2019/052827, filed Feb. 6, 2019, which claims the benefit of German Application No. 10 2018 203 333.1, filed Mar. 6, 2018, the subject matter of which are incorporated herein by reference in their entirety.

BACKGROUND OF THE INVENTION

The invention relates to a method for unambiguously determining the speed of an object on a radar measuring system.

DE 10 2014 212 280 A1 discloses a method which makes it possible to unambiguously determine the speed. Said document discloses a radar measuring system having an antenna pair consisting of a transmitting antenna and a receiving antenna. According to the FMCW method, a transmitting antenna transmits radar waves with a plurality of identical first ramps having a linear frequency increase. Said first ramps have a first time interval therebetween, which is identical for all successive first ramps. In addition, the transmitting antenna transmits the same ramps again as second ramps, which also have a linear frequency increase. The second ramps are also identical to one another and each have an identical second time interval therebetween which is identical to the first time interval. A second ramp is transmitted at a third time interval so as to be offset from the first ramp. In this sense, a first ramp and a second ramp form a pair of ramps.

Transmitted and reflected radar waves are detected by the receiving antenna, with a range-Doppler map being created for the first and second ramps according to the conventional method. Said range-Doppler map assigns an object a distance from the radar measuring system and a radial velocity. The radial velocity results from a first phase and a second phase. The first phase and the second phase are different in this case since the object has moved slightly during the third time interval. The radial velocity in this case is ambiguous with respect to each of the two range-Doppler maps since any multiple of the phase by $2\pi$ is possible. Thus, for example, with a speed resolution of from −10 m/s to +10 m/s, a determined speed of 5 m/s can also correspond to a speed of −15 m/s, 25 m/s, 45 m/s, etc.

The third time interval is now used, and for each realistically possible speed a phase difference is calculated which would result from this speed and the resulting displacement at the receiving antenna. This phase difference is also referred to as a third phase. At the correct speed, the third phase substantially corresponds to the difference between the first phase and the second phase. Therefore, the speed of which the third phase has the smallest distance from the difference between the first phase and the second phase is correct.

Usually a radar measuring system does not use only one transmitting antenna, but a plurality of transmitting antennas. The transmitting antennas usually transmit one after the other. If the speed is now determined unambiguously on the basis of the above explanations, one transmitting antenna must transmit twice, which increases the duration of a measurement process.

The problem addressed is therefore that of providing a method by means of which the speed can be unambiguously determined and, at the same time, the duration of a measurement process can be minimized.

This problem is solved by the method according to independent claim 1. Advantageous variants of the method are explained in the dependent claims.

The method is particularly suitable for a radar measuring system which is preferably mounted on a motor vehicle. The measuring system has at least two transmitting antennas and at least two receiving antennas. A transmitting antenna can transmit a radar wave which can be reflected by an object. The reflected radar wave can then be detected by the receiving antenna. Advantageously, the radar measuring system is designed for operation as a frequency-modulated continuous-wave radar, FMCW.

The measuring system has a first antenna pair which comprises a first transmitting antenna and a first receiving antenna of the measuring system. In addition, the measuring system has a second antenna pair which comprises a second transmitting antenna and a second receiving antenna of the measuring system. In principle, each transmitting antenna transmits a radar wave, with a reflection of this transmitted radar wave being detected by each receiving antenna. However, only the two antenna pairs are relevant for further consideration. The first transmitting antenna and the second transmitting antenna, in terms of hardware, are each formed on the measuring system by an individual antenna. The same also applies to the receiving antennas. The measuring system can also contain additional transmitting antennas and additional receiving antennas in addition to the antennas of the two antenna pairs.

Each possible antenna pair of the measuring system is mapped to a virtual antenna arrangement. How such a virtual antenna arrangement comes about is widely known. When using two transmitting antennas and four receiving antennas, the virtual antenna arrangement comprises eight virtual antennas. The first antenna pair, as a first virtual antenna, is mapped to a first position within the virtual antenna arrangement. The second antenna pair, as a second virtual antenna, is mapped to a second position within the virtual antenna arrangement. The further possible antenna pairs are mapped to further virtual antennas. The position of the first virtual antenna and the second virtual antenna on the radar measuring system are identical for the application of the method described below. Accordingly, the first antenna pair and the second antenna pair are mapped to the same position within the virtual antenna arrangement.

The same position of two virtual antennas within the virtual antenna arrangement means that each radar wave, with respect to the two antenna pairs, always covers the same path from transmission to detection, regardless of the position of the reflecting object. This means that the length of the path of the radar wave from the first transmitting antenna to the first receiving antenna is identical to the length of the path of the radar wave from the second transmitting antenna to the second receiving antenna.

For this virtual antenna arrangement, the assumption is made that the distance of the object from the antennas is much greater than the distance between the antennas. An object is spaced a few meters apart, whereas the antennas are spaced apart in the range of millimeters. This corresponds to a factor of approximately 1000.

If, for example, an identical radar wave is transmitted at the same time from the first transmitting antenna and from the second transmitting antenna, an identical signal, i.e. with an identical frequency and identical phase, is detected at the first receiving antenna and at the second receiving antenna for the associated first radar wave and the second radar wave. The first antenna pair and the second antenna pair thus behave in an identical manner.

The transmitting antennas transmit radar waves during a measurement process, with portions of the radar waves reflected by objects being detected by the receiving antennas. In the FMCW method, radar waves in the form of a plurality of segments are transmitted for each transmitting antenna. The frequency of the radar wave is modulated within such a distance. This modulation takes place, for example, so as to increase linearly over the time of the segment. A segment of this kind having a linearly increasing frequency is also referred to as a ramp.

The frequency of the reflected and detected segments or ramps is mixed with the current frequency of this ramp and filtered via a low-pass filter. In a known manner, the distance of the objects can be determined via a first Fourier transformation and the speed of the objects can be determined via a second Fourier transformation. This results in a range-Doppler map for each antenna pair.

The successive first segments of the first transmitting antenna have a first time internal Said first time interval is identical for all successive first segments. Said time interval determines the temporal distance between the beginning of a first segment and the beginning of the subsequent first segment.

In particular, the successive first segments are identical per se, i.e. in terms of duration, starting frequency, end frequency, phase at the beginning and frequency change, etc. The first transmitting antenna transmits a plurality of first segments, in particular 256 segments, as part of a measurement process.

The successive second segments of the first transmitting antenna have a second time interval. Said second time interval is identical for all successive second segments. Said time interval determines the temporal distance between the beginning of a second segment and the beginning of the subsequent second segment.

In particular, the successive second segments are also identical per se, i.e. in terms of duration, starting frequency, end frequency, phase at the beginning and frequency change, etc. The second transmitting antenna transmits a plurality of second segments, in particular 256 second segments, as part of a measurement process.

The first time interval and the second time interval are preferably also identical. Thus, preferably all segments transmitted by the first and second transmitting antenna are identical. The first and second segments are designed as ramps, for example. Ramps are segments which begin at a starting frequency and transition to an end frequency over their duration. The transition takes place by an increase or drop in the frequency, in particular via a linear increase.

A first segment and a second segment have a third time interval. Said third time interval describes the distance between the beginning of a first segment and the beginning of a second segment. For example, each first segment is assigned a second segment which is temporally offset by the third time interval.

Since the first antenna pair and the second antenna pair behave in the same way and the first and second time interval are also identical, the result of the evaluation is also identical. Due to the third time interval, the object, insofar as it carries out a relative movement, has moved from one segment to the next in the case of successive segments. This spatial change of location occurs, for example, from a first segment to a second segment and vice versa. Due to this time difference, a first phase of the radar wave of the first antenna pair differs from a second phase of the radar wave of the second antenna pair. This phase information is retained for the creation of the range-Doppler map for each antenna pair. The range-Doppler map of the first antenna pair comprises the first phase and the range-Doppler map of the second antenna pair comprises the second phase with respect to the object.

An object is then detected by means of the first antenna pair and the second antenna pair.

A first range-Doppler map is created from the measurement data from the first antenna pair by means of the above-mentioned Fourier transformations. A second range-Doppler map is created from the measurement data from the second antenna pair by means of the above-mentioned Fourier transformations. Said range-Doppler maps contain, as already mentioned, different phase information. The phase difference between the first phase and the second phase is correlated with the third time interval.

The first and the second range-Doppler map provide an ambiguous speed value for the object. This value corresponds to a speed within the detectable speed range of the measuring system. The speed value is ambiguous because speeds which correspond to a phase shift by $2\pi$ r are also included, With a speed resolution of from −10 m/s to +10 m/s, a determined speed of 5 m/s can also correspond to a speed of −15 m/s, 25 m/s, 45 m/s, etc. The speeds −15 m/s, 25 m/s, 45 m/s, etc. correspond to the multiple of $2\pi$.

Using the known third time interval, a third phase corresponding to a phase difference can be determined for each of the possible speeds of the speed value. This phase difference corresponds to the change in phase due to the change in location of the object from the first segment to the subsequent second segment, i.e. from the first speed value to the second speed value.

Accordingly, from the set of possible speeds of the ambiguous first speed value or the second ambiguous speed value, the speed at which the third phase is identical to the difference between the first phase and the second phase is correct. In a real test setup and in a real measurement, the third phase is almost identical to the difference between the first phase and the second phase. Accordingly, the speed at which the third phase has the smallest distance from the difference between the first phase and the second phase is correct.

The possible speeds can all be multiples or a limitation to the speeds that can also actually occur. In the case of a radar measuring system for a motor vehicle, this speed range can be limited to +/−400 km/h, for example.

Alternatively, the third phase can be calculated for a possible speed without phase shifting by $2\pi$, and it can then be verified whether the phase distance between the third phase and the difference between the first phase and the second phase is small enough. Then, the next possible speed with phase shifting of $2\pi$ is calculated and verified. Then with $-2\pi$, $4\pi$, $-4\pi$, etc. until the correct speed is determined. This ensures that only the minimum number of calculations are performed. Accordingly, the verification is carried out immediately after the determination of the third phase verified. For this purpose, a range can be provided from which the third phase may deviate at most. Then, one possible speed after the other is determined until the correct one is verified.

The above remarks also apply for segments designed as ramps.

The measuring system can also be equipped with further transmitting and receiving antennas to allow precise detection of the objects, in particular the distance and speed, Using the described method, the objects can then be assigned the unambiguous speed. The further antennas are preferably arranged at their own positions within the virtual antenna arrangement.

In addition to the first and second antenna pair, it is advantageous to have further pairs or groups of antenna pairs which are mapped to an identical position within the virtual antenna arrangement. Thus, the method can be carried out by a plurality of independent virtual antenna pairs. The determined unambiguous speed can thus be verified again against one another by two independent measurements.

Advantageous variants of the method are also explained.

SUMMARY OF THE INVENTION

According to the invention, two transmitting antennas transmit one after the other.

Transmission by two or more transmitting antennas means that, within a time range, for example a time range of a segment, only one transmitting antenna transmits, followed by another. There can be a short transmission pause between the successive transmission by two transmitting antennas, within which none of the transmitting antennas transmits radar waves. When using four transmitting antennas, for example, first the first transmitting antenna, then the second, then the third, and thereafter the fourth transmitting antenna can transmit a segment. This transmission sequence can be repeated several times, for example, during a measurement process, in particular 256 times.

Favorably, the first time interval and/or the second time interval are not integral multiples of the third time interval or the second time interval.

Advantageously, the first segments are identical. It is advantageous if the second segments are also identical. Furthermore, according to the invention, the first segment is identical to an associated second segment.

Identity can consist in particular in the temporal duration, the starting frequency, the end frequency and/or the frequency increase. It is advantageous if two successive segments begin with the same phase, in particular two successive first segments, two successive second segments or a second segment following a first segment. This identity between the phases at the beginning of the segment is also referred to as phase synchronicity of the segments.

In a further variant, a transmitted segment is transmitted as a ramp having a uniformly and linearly increasing frequency.

This is a known modulation method for a FMCW radar. In addition, this method is particularly advantageous when using radar measuring systems in motor vehicles.

In addition, a radar measuring system is proposed which uses or carries out a method according to at least one of the above-described variants or according to any of claims 1 to 6.

BRIEF DESCRIPTION OF THE DRAWINGS

The method and the radar measuring system are also explained in detail and by way of example with reference to several drawings, in which:

FIG. 1b shows a virtual antenna arrangement of the radar measuring system from FIG. 1a;

DESCRIPTION

Figure 1A:
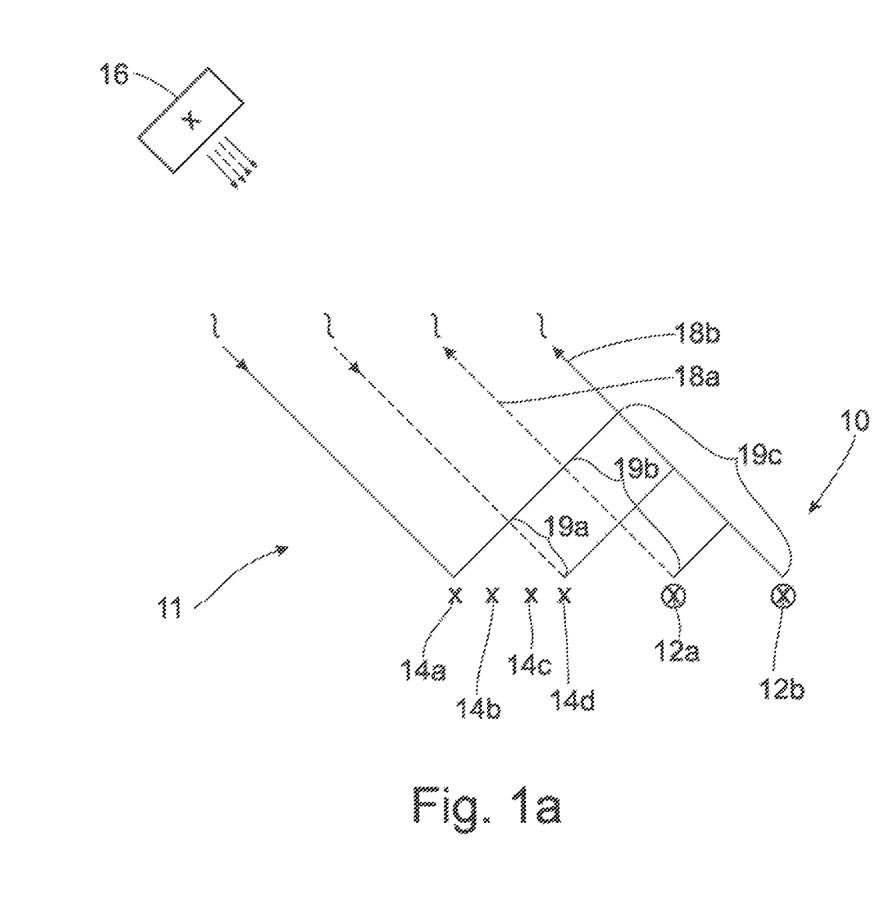
FIG. 1a shows a detail of a radar measuring system.

FIG. 1a shows a radar measuring system 10 in part. In particular, an antenna arrangement 11 of the radar measuring system 10 is shown. The radar measuring system 10 also comprises electronics for the control and evaluation of the individual components, which electronics have two transmitting antennas 12a and 12b and four receiving antennas 14a, 14b, 14c and 14d. The transmitting antennas 12 transmit radar waves which can be reflected by an object 16. The reflected radar waves can be received by the receiving antennas 14a, 14b, 14c and 14d. The radar waves are shown as lines, dashed 18a and solid 18b, for the sake of simplicity. The radar waves 18 as well as the ratios of the distances between the antennas and the object are not to scale. In particular, the distance between the object 16 and the measuring system 10 is many times greater than the distance between the antennas, and so a far-field assumption is justified for all detected objects. This far-field assumption is represented in FIG. 1 a by "~".

Figure 1B:
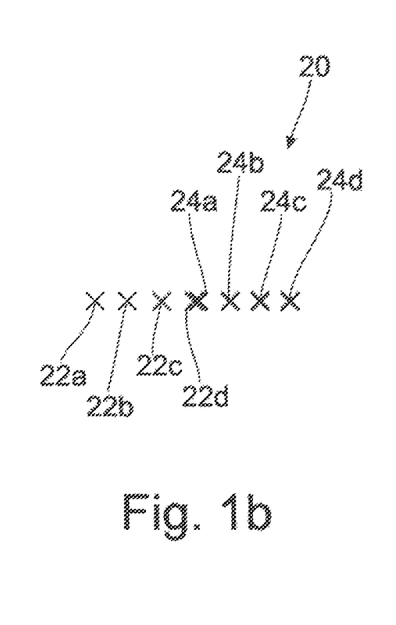

Accordingly, each transmitting antenna 12 is mapped to each receiving antenna 14. Such an antenna arrangement 11 can also be represented as a virtual antenna arrangement 20, which is shown in FIG. 1b. Each transmitting antenna 12a, 12b is mapped, together with each of the receiving antennas, 14a, 14b, 14c and 14d, to a position within the virtual antenna arrangement 20. A transmitting antenna forms an antenna pair 22, 24 together with a receiving antenna.

The transmitting antenna 12a with the receiving antennas 14 provides the antenna pair 22, and the transmitting antenna 12b with the receiving antennas 14 provides the antenna pair 24. FIG. 1b shows the position of the virtual antenna with the reference number of the antenna pair. The positions of the virtual antennas 22 are shown as dashed crosses, and the positions of the virtual antennas 24 are shown as solid crosses.

The transmitting antenna 12a is mapped to position 22a with the receiving antenna 14a, to position 22b with the receiving antenna 14b, to position 22c with the receiving antenna 14c, and to position 22d with the receiving antenna 14d. Likewise, the transmitting antenna 12b is mapped to position 24a with the receiving antenna 14a, to position 24b with the receiving antenna 14b, to position 24c with the receiving antenna 14c, and to position 24d with the receiving antenna 14d.

Figure 1C:
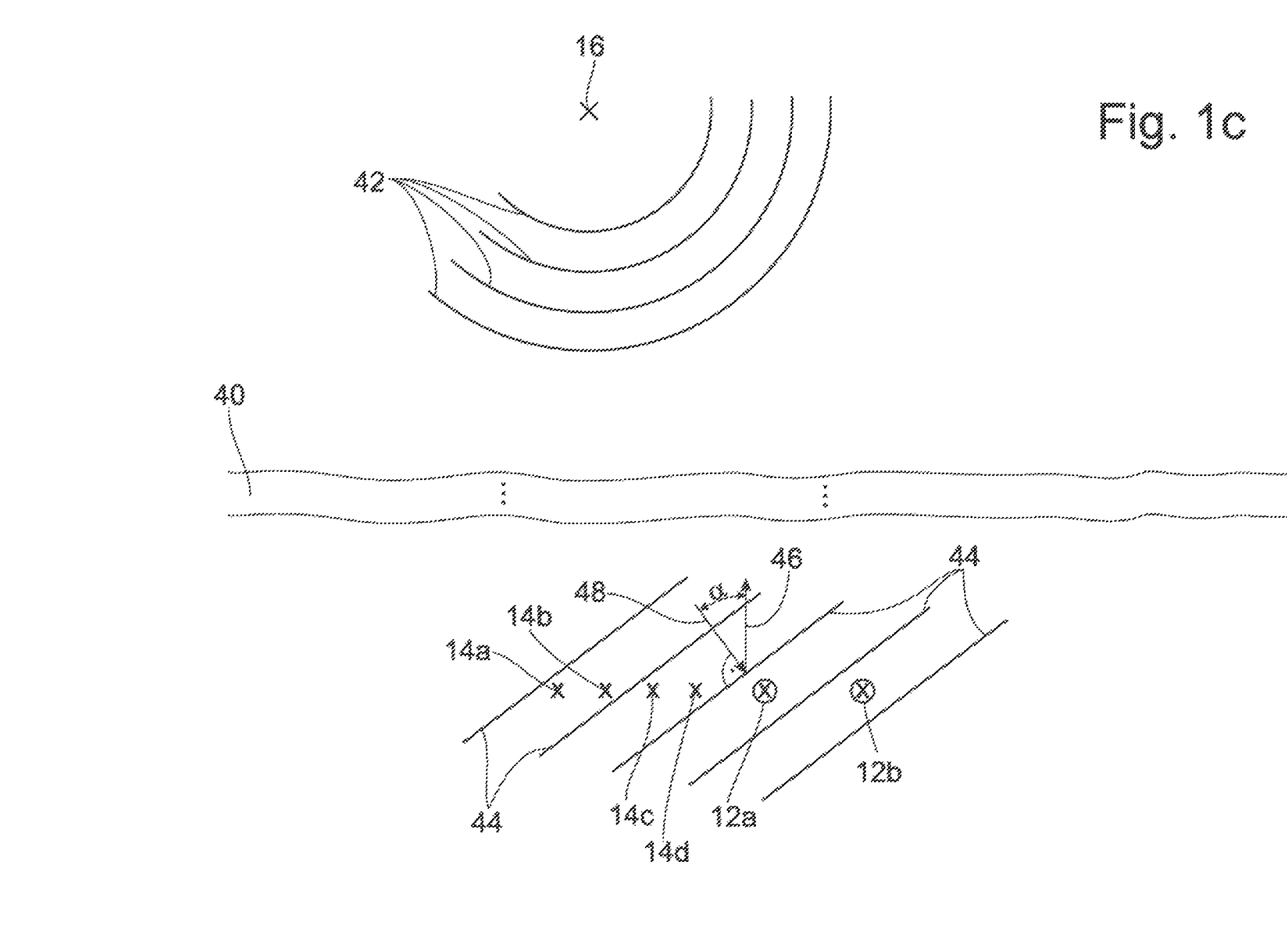
FIG. 1c shows an assumption for the virtual antenna arrangement.

Due to the far-field assumption, the outgoing and incident radar waves can be regarded as wave fronts, as shown in FIG. 1c. The radar waves 18 which are transmitted and received travel along parallel paths. The schematic representation of the radar waves at the object 16 is intended to illustrate the reflection of the radar waves that strike a point on the object. In particular, the paths from the transmitting antenna 12a to the receiving antenna 14d and from the transmitting antenna 12b to the receiving antenna 14a are of equal length. The sum of the path differences 19a and 19b corresponds to the path difference 19c such that, when radar waves are transmitted simultaneously by the transmitting antennas 12a and 12b to the receiving antennas 14a and 14d, radar waves having the same phase are incident.

Position 22d and position 24a are identical in the virtual antenna arrangement 20. This identical position means that a determined phase of the antenna pair 22d and 24a with their associated virtual antennas 22d and 24a is always identical, when the transmitting antennas 12a and 12b transmit simultaneously, regardless of the positions of the object 10 in the measuring space of the radar measuring system 10. Both antenna pairs 22d and 24a thus provide the same information.

As already mentioned, the virtual antenna arrangement is based on the far-field assumption, which is explained in more detail in FIG. 1c. FIG. 1c substantially corresponds to FIG. 1a, although the radar waves are no longer represented by lines but by wave fronts. The principle of the virtual antenna arrangement is based on the different distance ratios between antennas and between antennas and the object. In this case the antennas 12, 14 are only a few millimeters apart; however, the distance between the antennas 12, 14 and the object 16 corresponds to at least a few meters. This large difference in the distance, which corresponds approximately to a factor of 1000, is shown in the drawing by the bar 40.

A radar wave normally propagates as an elementary wave, as shown in the upper part of FIG. 1c. The wave fronts 42 propagate in a spherical shape. At a large distance, this spherical wave front of the elementary wave can be regarded as a rectilinear wave front 44. The wave fronts 44 are parallel to one another. The shown wave front 44 propagates in the propagation direction 48 at an angle α to the viewing direction 46 of the radar measuring system 10. At an angle α=0 all receiving antennas 14 detect the same phase.

The transmitting antenna 12a is also referred to as the first transmitting antenna and the transmitting antenna 12b is referred to as the second transmitting antenna, and the receiving antenna 14d is referred to as the first receiving antenna and the receiving antenna 14a is referred to as the second receiving antenna. The first antenna pair 22d corresponds to the first virtual antenna and the antenna pair 24a corresponds to the second virtual antenna.

Figure 2:
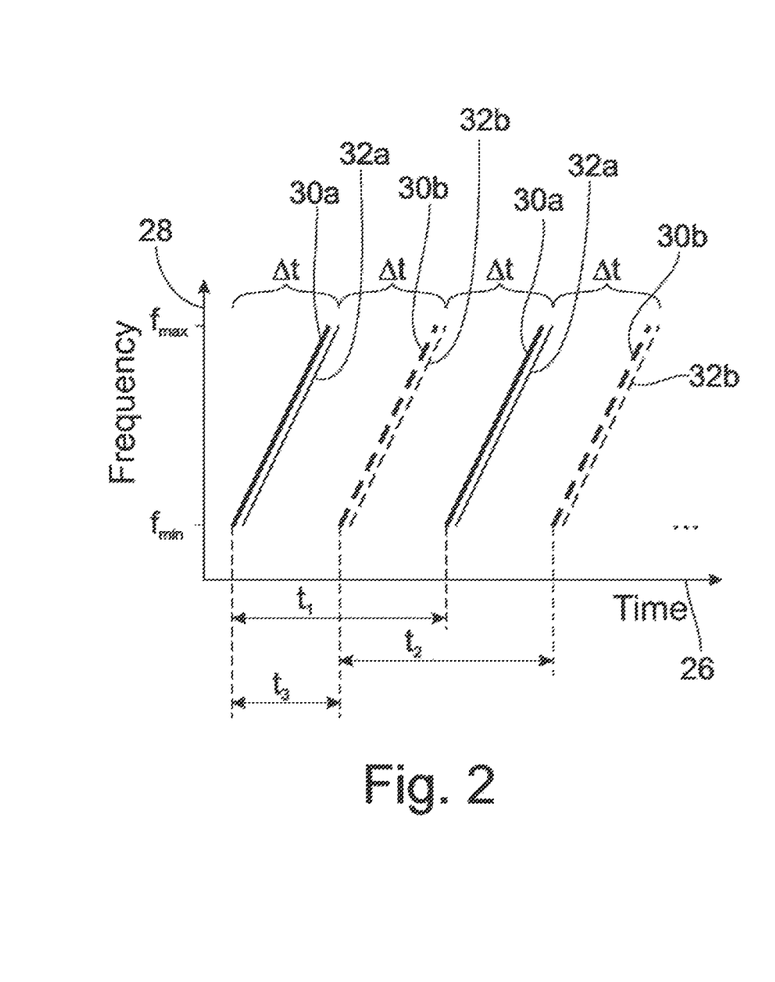
FIG. 2 shows a sequence of the transmitted radar waves.

FIG. 2 shows the temporal sequence of the transmission of the radar waves. The representation is limited to the radar waves 18a and 18b of the antenna pairs 22d and 24a. The time is plotted on the X axis 26, and the frequency is plotted on the Y axis 28.

According to the FMCW method, a plurality of segments 30 are transmitted by each transmitting antenna 12a and 12b. Said segments 30 are formed by ramps. The first transmitting antenna 12a transmits the first ramps 30a, and the second transmitting antenna transmits the second ramps 30b. The first ramps 30a are shown as a solid line with respect to the first antenna pair, and the second ramps 30b are shown as a dashed line with respect to the second antenna pair.

A transmitted segment of the ramp begins with a minimal frequency, the frequency increasing linearly over the time duration of the transmission Δt to the maximum frequency. In addition, the transmitted ramps all start with the same starting phase.

The transmitted ramps 30 are at least partly reflected by the object 16 and subsequently detected by the receiving antennas 14d and 14a. A first ramp 30a is detected as a first signal 32a with respect to the first antenna pair 22d, and a second ramp 30b is detected as a second signal 32b with respect to the second antenna pair 24a. The received signals 32 are substantially identical to the associated ramps 30, but are temporally offset by the propagation time of the radar wave. The received signals 32 are represented by correspondingly thinner lines, whereas the transmitted ramps 30 have thick lines.

The first ramps 30a are identical. In addition, the second ramps 30b are also identical. Furthermore, the first ramps 30a and the second ramps 30b are identical.

The first ramps 30a are transmitted in uniform first time intervals $t_1$. The second ramps 30b are transmitted in uniform second time intervals $t_2$. By way of example, four ramps 30 are shown in FIG. 2, with 256 ramps being transmitted in this case for each transmitting antenna 12.

A first ramp 30a and a second ramp 30b are assigned to one another in each case, in that a third time segment $t_3$ lies between the transmission of the first ramp 30a and the transmission of the second ramp 30b. The third time interval $t_3$ is selected such that the transmission of the radar waves does not temporally overlap.

Figure 3:
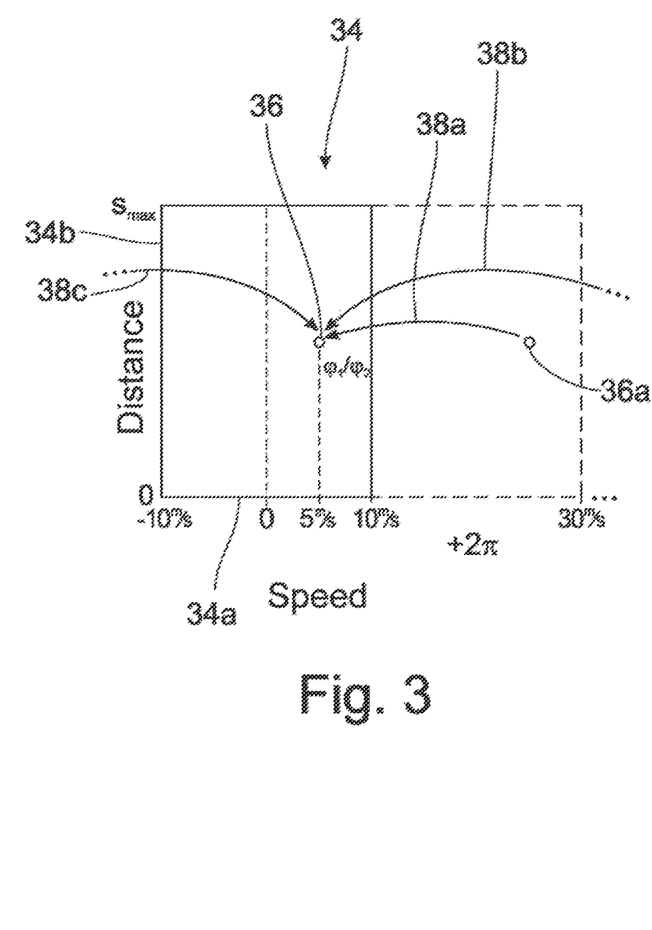
FIG. 3 shows a range-Doppler map.

From the determined signals 32a and 32b, the range-Doppler maps 34 shown in FIG. 3 can be determined for the first antenna pair 22d and the second antenna pair 24a by two Fourier transformations in each case. The range-Doppler maps 34 are substantially identical for both antenna pairs 22d, 24a, For this reason, only one range-Doppler Map 34 is shown for both antenna pairs 22d, 24a. Differences will be explained below.

The object 16 is shown in the range-Doppler map 34 as a data point 36 with its distance and speed. This representation with a data point 36 is chosen, by way of example, because radar waves are usually reflected at several points on an object, which then appear in the range-Doppler map 34. On the range-Doppler map 34, the speed is plotted on the X axis 34a and the distance of the object from the radar measuring system 10 is plotted on the Y axis 34b.

The speed of the object 16 is not ambiguous for phase differences of $2\pi$. The object 16, which is mapped to a speed of 5 m/s, for example, can also correspond to a speed of −15 m/s, 25 m/s, 45 m/s, etc. at a detection range of from −10 m/s to 10 m/s. For the speed of 25 m/s, for example, a data point 36a is represented in a part of the range-Doppler map 34 that is expanded by the phase $2\pi$. This expanded part of the range-Doppler map 34 is shown in dashed lines.

The data point 36a is thus mapped to 5 m/s according to the arrow 38a. A speed of 25 m/s is shown as 5 m/s in the range-Doppler map 34. In addition, further arrows 38 are also shown which map corresponding multiples of $2\pi$ phase difference to the data point 36.

The speed of the data point 36 is therefore rather a speed value which comprises a plurality of speeds.

The data point 36 of the range-Doppler map 34 of the first antenna pair 22d has a first phase $\Psi_1$ whereas the data point 36 of the range-Doppler map 34 of the second antenna pair 24a has a second phase $\Psi_2$. The first phase $\Psi_1$ and second phase $\Psi_2$ are different because the object has moved slightly during the third time interval $t_3$.

For each possible speed of the speed value, a third phase $\Psi_3$ is now determined. Said third phase $\Psi_3$ corresponds to the phase difference to be expected for two successive ramps 30 having a time interval $t_3$ for the possible speeds. Each determined third phase $\Psi_3$ is then compared with the difference between the first phase $\Psi_1$ and the second phase $\Psi_2$. The third phase $\Psi_3$ which has the smallest distance from the difference between the first phase $\Psi_1$ and the second phase $\Psi_2$ corresponds to the correct speed.

The following therefore applies: $\Psi_3 \approx \Psi_1 - \Psi_2$. The speed of the object can thus be unambiguously determined by means of the method explained. The further speeds, for which $\Psi_3 \neq \Psi_1 - \Psi_2$, are discarded as incorrect.

This relationship between speed and phase is also described by the following formula:

$$\Psi_3 = 2\pi \frac{2vt_3}{\lambda}$$

-continued where $$\lambda = \frac{c}{f}$$

v corresponds to the speed of the object, where $t_3$ is the third time interval, c is the speed of light and f is the carrier frequency of the radar wave. The carrier frequency corresponds in this case to 77 GHz, for example.

Figure 4:
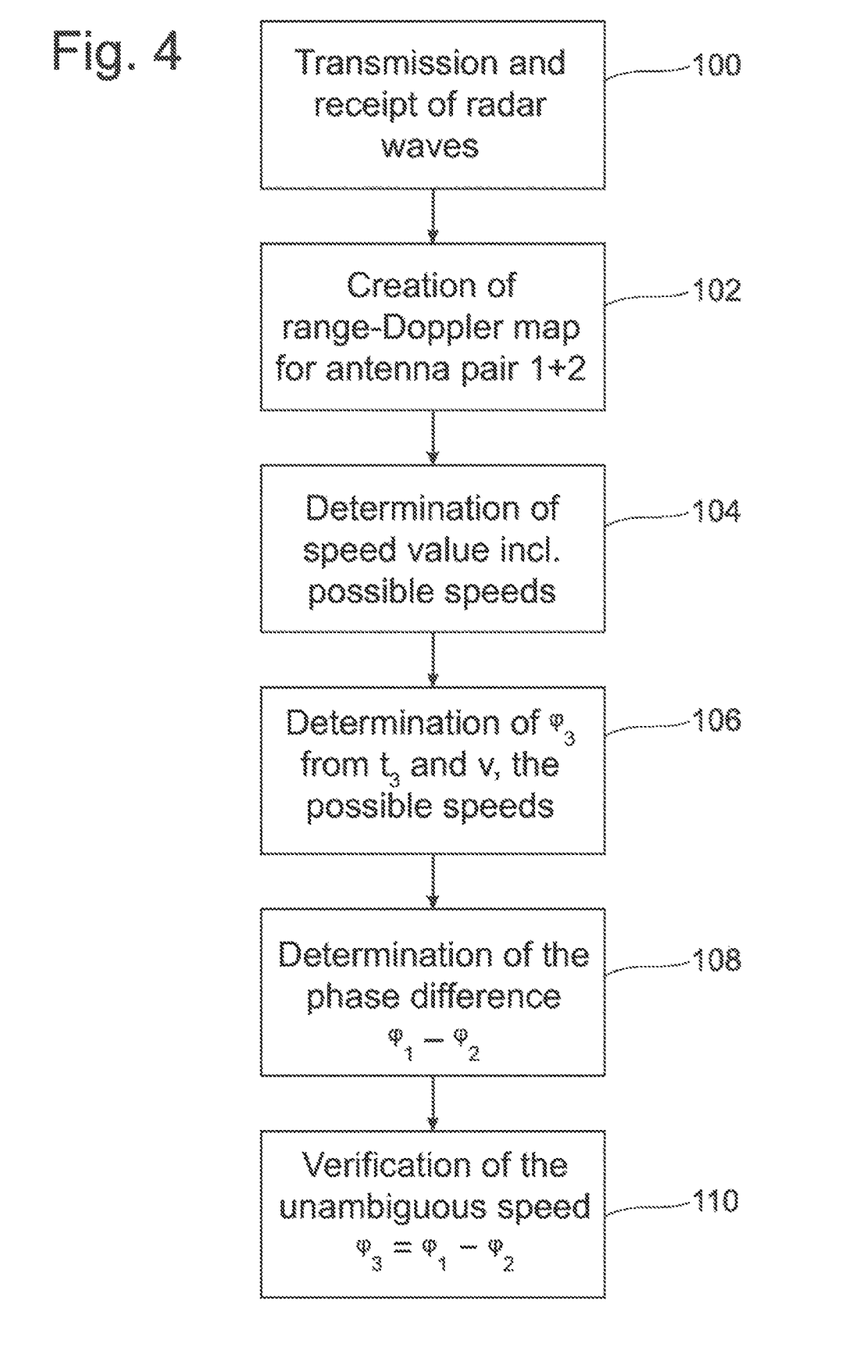
FIG. 4 shows a flow chart for the method for determining the speed.

FIG. 4 shows the steps of the method in a flow chart.

In a first step 100, the radar waves are transmitted by the transmitting antennas and reflected portions are received by the receiving antennas.

In a subsequent step 102, the received radar waves are evaluated via the Fourier transformations explained, and the range-Doppler maps are created at least for the first antenna pair and the second antenna pair.

A next step 104 involves determining the speed value from the range-Doppler map. The speed value contains the information regarding the possible speeds v, which are also determined in step 104 or a sub-step.

In the subsequent step 106, the associated third phases $\Psi_3$ are determined from the third time interval $t_3$ and the possible speeds v. The third phases $\Psi_3$ are advantageously determined for speeds v within meaningful boundary conditions.

In the subsequent step 108, the phase difference between the first phase $\Psi_2$ and the second phase $\Psi_2$ is determined. The order of steps 106 and 108 can also be swapped, or said steps can be carried out at the same time.

In the subsequent step 110, the correct speed from the plurality of speeds of the speed value is verified by $\Psi_3 \approx \Psi_1 - \Psi_2$.

LIST OF REFERENCE SIGNS 10 radar measuring system
11 antenna arrangement
12a, b transmitting antenna
14a, b, c, d receiving antenna
16 object
18a, b radar wave
19,a c path difference
20 virtual arrangement
22 antenna pair/virtual antenna
24 antenna pair/virtual antenna
26 X axis
28 Y axis
30,a, b segment/ramp
32,a, b signal
34 range-Doppler map
34a X axis
34b Y axis
36,a data point
38,a, b, c arrow
40 bar
42 wave front
44 wave front
46 viewing direction
propagation direction
100 step
102 step
104 step
106 step
108 step
110 step $t_1$ time interval
$t_2$ time interval
$t_3$ time interval
$\Delta t$ time duration of the transmission
$\alpha$ angle
$\Psi_1, \Psi_2, \Psi_3$ phase

The invention claimed is:

1. Method for unambiguously determining the speed of an object (16) on a radar measuring system (10), comprising:
mapping a first antenna pair (22d) including a first transmitting antenna (12a) and a first receiving antenna (14d) to a position on a virtual antenna arrangement (20),
mapping a second antenna pair (24a) including a second transmitting antenna (12b) and a second receiving antenna (14a) to the position on the virtual antenna arrangement (20) to,
transmitting from the first transmitting antenna (12a) successive frequency modulated segments (30a) of radar waves having a first time interval ($t_1$),
transmitting from the second transmitting antenna (12b) successive frequency modulated segments (30b) of radar waves having a second time interval ($t_2$) identical to the first time interval ($t_1$),
wherein the segment (30a) of the first transmitting antenna (12a) has a third time interval ($t_3$) with respect to the segment (30b) of the second transmitting antenna (12b),
detecting an object (16) using the first and second segments (30a, 30b) transmitted from the first antenna pair (22d) and the second antenna pair (24a),
determining the distance of the detected object (16) and a first ambiguous speed value having a first phase ($\Psi_1$) with the first antenna pair (22d) and a second ambiguous speed value having a second phase ($\Psi_2$) with the second antenna pair (24a), and
determining a third phase ($\Psi_3$) for the possible speeds of the speed values based on the third time interval ($t_3$) with
the speed of the third phase ($\Psi_3$) closest to the difference between the first phase ($\Psi_1$) and the second phase ($\Psi_2$) corresponding to the actual speed of the object (16).

2. Method according to claim 1, wherein the first and second transmitting antennas (12a, 12b) transmit one after the other.

3. Method according to claim 2, wherein that the first time interval ($t_1$) or the second time interval ($t_2$) is not an integral multiple of the third time interval ($t_3$).

4. Method according to claim 3, wherein that the first segments (30a) are identical, the second segments (30b) are identical and/or the first segments (30a) are identical to the associated second segments (30b).

5. Method according to claim 3, wherein the first transmitting antenna (12a) transmits the first segments (30a) with a ramp having a uniformly and linearly increasing frequency.

6. Method according to claim 2, wherein that the first segments (30a) are identical, the second segments (30b) are identical and/or the first segments (30a) are identical to the associated second segments (30b).

7. Method according to claim 1, wherein that the first time interval ($t_1$) or the second time interval ($t_2$) is not an integral multiple of the third time interval ($t_3$).

8. Method according to claim 7, wherein that the first segments (30a) are identical, the second segments (30b) are identical and/or the first segments (30a) are identical to the associated second segments (30b).

9. Method according to claim 8, wherein the first and second transmitting antennas (12*a*, 12*b*) transmit one after the other.

10. Method according to claim 1, wherein that the first segments (30*a*) are identical, the second segments (30*b*) are identical and/or the first segments (30*a*) are identical to the associated second segments (30*b*).

11. Method according to claim 1, wherein the first transmitting antenna (12*a*) transmits the first segments (30*a*) with a ramp having a uniformly and linearly increasing frequency.

12. Radar measuring system (10) which uses a method according to claim 1.

* * * * *